(12) United States Patent
Starr et al.

(10) Patent No.: US 11,949,989 B2
(45) Date of Patent: Apr. 2, 2024

(54) MULTIPLE CAMERA IMAGER FOR INSPECTION OF LARGE DIAMETER PIPES, CHAMBERS OR TUNNELS

(71) Applicant: RedZone Robotics, Inc., Pittsburgh, PA (US)

(72) Inventors: Justin Starr, Baden, PA (US); Galin Konakchiev, Pittsburgh, PA (US); Foster J Salotti, Verona, PA (US); Todd Kueny, Tarentum, PA (US); Thorin Tobiassen, Pittsburgh, PA (US); Nate Alford, North Huntington, PA (US); Mark Jordan, Pittsburgh, PA (US)

(73) Assignee: RedZone Robotics, Inc., Warrendale, PA (US)

( * ) Notice: Subject to any disclaimer, the term of this patent is extended or adjusted under 35 U.S.C. 154(b) by 0 days.

(21) Appl. No.: 16/145,333

(22) Filed: Sep. 28, 2018

(65) Prior Publication Data
US 2019/0104252 A1   Apr. 4, 2019

Related U.S. Application Data

(60) Provisional application No. 62/565,167, filed on Sep. 29, 2017.

(51) Int. Cl.
*H04N 23/698*   (2023.01)
*G01N 21/88*   (2006.01)
(Continued)

(52) U.S. Cl.
CPC ....... *H04N 23/698* (2023.01); *G01N 21/8851* (2013.01); *G01N 21/954* (2013.01);
(Continued)

(58) Field of Classification Search
CPC .......... H04N 5/23238; H04N 5/23299; H04N 5/2252; H04N 5/2253; H04N 5/2258;
(Continued)

(56) References Cited

U.S. PATENT DOCUMENTS 5,392,715 A * 2/1995 Pelrine .................... F16L 55/28
                                                        104/138.2
5,878,783 A * 3/1999 Smart ..................... F16L 55/28
                                                        104/138.2
(Continued)

FOREIGN PATENT DOCUMENTS

CA    2256185 A1 *  6/2000  ............. H04N 7/181
GB    2342419 A  *  4/2000  ............. F16L 55/26

*Primary Examiner* — Michael Lee
(74) *Attorney, Agent, or Firm* — Gabriel & Co; Andrew M Gabriel (57) ABSTRACT

One embodiment provides a system, including: an inspection platform configured to move through underground infrastructure; an imaging device coupled to the inspection platform; the imaging device comprising a camera housing that arranges an array of four or more cameras in a predetermined configuration; the camera housing comprising a plurality of apertures, wherein each aperture houses a respective camera therein with a viewing axis offset about 30 degrees to about 120 degrees from a viewing axis of an adjacent camera within the array; and circuitry that operates the imaging device to capture a plurality of images using the four or more cameras; where the circuitry captures the plurality of images for a composite image of an interior region of the underground infrastructure, and where the region is larger than a single viewing field of any of the four or more cameras. Other embodiments are described and claimed.

5 Claims, 7 Drawing Sheets (51) Int. Cl.
  *G01N 21/954* (2006.01)
  *G03B 37/00* (2021.01)
  *H04N 23/45* (2023.01)
  *H04N 23/51* (2023.01)
  *H04N 23/54* (2023.01)
  *H04N 23/695* (2023.01)
  *H04N 23/90* (2023.01)
  *F16L 55/26* (2006.01)
  *F16L 101/30* (2006.01)
  *H04N 7/10* (2006.01)
  *H04N 23/50* (2023.01)

(52) U.S. Cl.
  CPC ........... *G03B 37/005* (2013.01); *H04N 23/45* (2023.01); *H04N 23/51* (2023.01); *H04N 23/54* (2023.01); *H04N 23/695* (2023.01); *H04N 23/90* (2023.01); *F16L 55/265* (2013.01); *F16L 2101/30* (2013.01); *H04N 7/10* (2013.01); *H04N 23/555* (2023.01)

(58) Field of Classification Search
  CPC .. H04N 5/247; H04N 7/10; H04N 2005/2255; G01N 21/8851; G03B 37/005; F16L 55/265; F16L 2101/30
  USPC ........................................................... 348/38
  See application file for complete search history.

(56) References Cited

U.S. PATENT DOCUMENTS

| | | | |
|---|---|---|---|
| 6,845,819 B2* | 1/2005 | Barrett | E21B 23/00 166/250.01 |
| 7,894,689 B2* | 2/2011 | Liu | |
| 8,525,124 B2* | 9/2013 | Atwood | B62D 55/244 250/394 |
| 9,784,599 B1* | 10/2017 | Close | B60F 5/00 |
| 2004/0173116 A1* | 9/2004 | Ghorbel | F16L 55/38 104/138.2 |
| 2006/0167940 A1* | 7/2006 | Colton | |
| 2006/0226337 A1* | 10/2006 | Lim | |
| 2006/0290779 A1* | 12/2006 | Reverte | E03F 7/10 348/84 |
| 2007/0013805 A1* | 1/2007 | Suk | |
| 2007/0197875 A1* | 8/2007 | Osaka | A61B 1/04 600/173 |
| 2009/0259564 A1* | 10/2009 | Barkerding | |
| 2012/0069172 A1* | 3/2012 | Hudritsch | H04N 5/23238 348/84 |
| 2014/0320631 A1* | 10/2014 | Olsson | |
| 2016/0139061 A1* | 5/2016 | Kesselberg | G03B 15/03 348/37 |
| 2016/0261829 A1* | 9/2016 | Olsson | H04N 5/2252 |
| 2017/0070711 A1* | 3/2017 | Grundhofer | H04N 9/3185 |

* cited by examiner

MULTIPLE CAMERA IMAGER FOR
INSPECTION OF LARGE DIAMETER PIPES,
CHAMBERS OR TUNNELS

CROSS-REFERENCE TO RELATED
APPLICATIONS

This application claims priority to U.S. provisional patent application Ser. No. 62/565,167, having the same title as this application, and filed on 29 Sep. 2017, the contents of which are hereby incorporated by reference in their entirety.

FIELD

The subject matter described herein relates to collection and use of image data for underground infrastructure such as large diameter pipes, tunnels and chambers.

BACKGROUND

Underground infrastructure such as large diameter pipes, tunnels and chambers (on the order of twenty feet or more) need to be inspected and maintained. Visual inspections are often done as a matter of routine upkeep or in response to a noticed issue.

Various systems and methods exist to gather inspection data. For example, inspection data may be obtained by using closed circuit television (CCTV) cameras or via inspection using a mobile pipe inspection robot that employs laser scanning, sonar scanning, or a combination of the foregoing. Such methods include traversing through a pipe or other underground infrastructure asset with an inspection unit and obtaining inspection data regarding the interior, e.g., images and/or other sensor data for visualizing pipe features such as pipe defects, cracks, intrusions, etc. An inspection crew is deployed to a location and individual pipe segments are inspected, often in a serial fashion, in order to collect inspection data and analyze it.

BRIEF SUMMARY

In summary, one embodiment provides a system, comprising: an inspection platform configured to move through underground infrastructure; an imaging device coupled to the inspection platform; the imaging device comprising a camera housing that arranges an array of four or more cameras in a predetermined configuration; the camera housing comprising a plurality of apertures, wherein each aperture houses a respective camera therein with a viewing axis offset about 30 degrees to about 120 degrees from a viewing axis of an adjacent camera within the array; and circuitry that operates the imaging device to capture a plurality of images using the four or more cameras; wherein the circuitry captures the plurality of images for a composite image of an interior region of the underground infrastructure, the interior region being larger than a single viewing field of any of the four or more cameras.

Another embodiment provides an imaging device, comprising: a camera housing that arranges an array of four cameras in a predetermined configuration; the camera housing comprising: a first housing having three sides, each having an aperture therein; three cameras disposed within a respective aperture of the first housing, wherein each camera has a viewing axis offset from a viewing axis of an adjacent camera by about 120 degrees; a flat, triangular end part that comprises a fourth aperture therein; and a fourth camera disposed within the fourth aperture and having a viewing axis offset from each viewing axis of the three cameras by about 90 degrees; and a main housing comprising circuitry that operates the imaging device to capture a plurality of images using the four cameras, wherein the circuitry captures the plurality of images for a composite image of an interior region of underground infrastructure, and wherein the interior region is larger than a field of view of any of the four cameras.

Another embodiment provides an imaging device, comprising: a camera housing that arranges an array of four cameras in a predetermined configuration; the camera housing comprising a first housing having four sides arranged in a pyramidal fashion, wherein each of the four sides terminates in a common tip portion, and wherein each of the four sides has an aperture therein; four cameras disposed within a respective aperture of the first housing, wherein each camera has a viewing axis offset from a viewing axis of an adjacent camera by about 90 degrees; and a main housing comprising circuitry that operates the imaging device to capture a plurality of images using the four cameras, wherein the circuitry captures the plurality of images for a composite image of an interior region of underground infrastructure, and wherein the interior region is larger than a field of view of any of the four cameras.

Another embodiment provides an imaging device, comprising: a camera housing that arranges an array of cameras in a predetermined configuration; the camera housing comprising a circular housing having twelve apertures therein; twelve cameras disposed within a respective aperture of the circular housing, wherein each camera has a viewing axis offset from a viewing axis of an adjacent camera by about 30 degrees; and circuitry that operates the imaging device to capture a plurality of images using the array of cameras, wherein the circuitry captures the plurality of images for a composite image of an interior region of underground infrastructure, and wherein the interior region is larger than a field of view of any of the cameras individually.

The foregoing is a summary and is not intended to be in any way limiting. For a better understanding of the example embodiments, reference can be made to the detailed description and the drawings. The scope of the invention is defined by the claims.

DETAILED DESCRIPTION

It will be readily understood that the components of the embodiments, as generally described and illustrated in the figures herein, may be arranged and designed in a wide variety of ways in addition to the examples described herein. The detailed description uses examples, represented in the figures, but these examples are not intended to limit the scope of the claims.

Reference throughout this specification to "embodiment(s)" (or the like) means that a particular described feature or characteristic is included in that example. This particular feature or characteristic may or may not be claimed. This particular feature may or may not be relevant to other embodiments. For the purpose of this detailed description, each example might be separable from or combined with another example, i.e., one example is not necessarily relevant to other examples.

Therefore, the described features or characteristics of the examples generally may be combined in any suitable manner, although this is not required. In the detailed description, numerous specific details are provided to give a thorough understanding of example embodiments. One skilled in the relevant art will recognize, however, that the claims can be practiced without one or more of the specific details found in the detailed description, or the claims can be practiced with other methods, components, etc. In other instances, well-known details are not shown or described to avoid obfuscation.

The inspection process for large diameter underground infrastructure, such as pipes, tunnels or chambers having diameters on the order of twenty feet or more, is quite labor intensive, costly and time consuming. It is important, yet challenging, to obtain high quality inspection data for such environments. In some cases, multiple passes must be made through the interior of an underground infrastructure asset in order to obtain images of the interior that are of sufficient quality. This may result from needing to make multiple passes through the interior of the underground infrastructure asset with sensors oriented differently in order to obtain complete coverage of the area or region of interest within the interior. This may also result from a need to improve the quality or resolution of certain regions within images, even if wide angle lenses are employed and offer adequate coverage.

Accordingly, an embodiment provides for the collection and use of image data for underground infrastructure assets such as a large diameter pipe using an imaging device that includes a camera array. An embodiment provides an imaging device, e.g., a 60-megapixel imaging device, deployed on an inspection platform, such as an autonomous tracked robot, floating platform, etc. In an embodiment, the imaging device includes 12, 5-megapixel cameras placed together in an array. Images from the different cameras are stitched together using software to synchronize and control the imaging process. The imaging device is suitable for capturing a full picture, e.g., in 360 degrees, of the inside surface of a large diameter pipe, chamber or tunnel (e.g., on the order of 20 feet or more in diameter).

An imaging system according to an embodiment uses between 4 to 12 cameras mounted in such a way as to capture a 360-degree image, with ample overlap between the camera views so that the results can be stitched together, e.g., into a single panoramic image that may be projected onto the inside walls of a cylinder to replicate a pipe interior in a three-dimensional (3D) visual effect or a virtual panning effect.

The imaging device may be attached to an inspection robot or an inspection platform in a modular fashion, for example as a plug and play type element. In an embodiment, the imaging device may be integrated into an inspection platform or may be implemented and used as a stand-alone unit or module.

The description now turns to the figures. The illustrated example embodiments will be best understood by reference to the figures. The following description is intended only by way of example and simply illustrates certain selected example embodiments.

Figure 1:
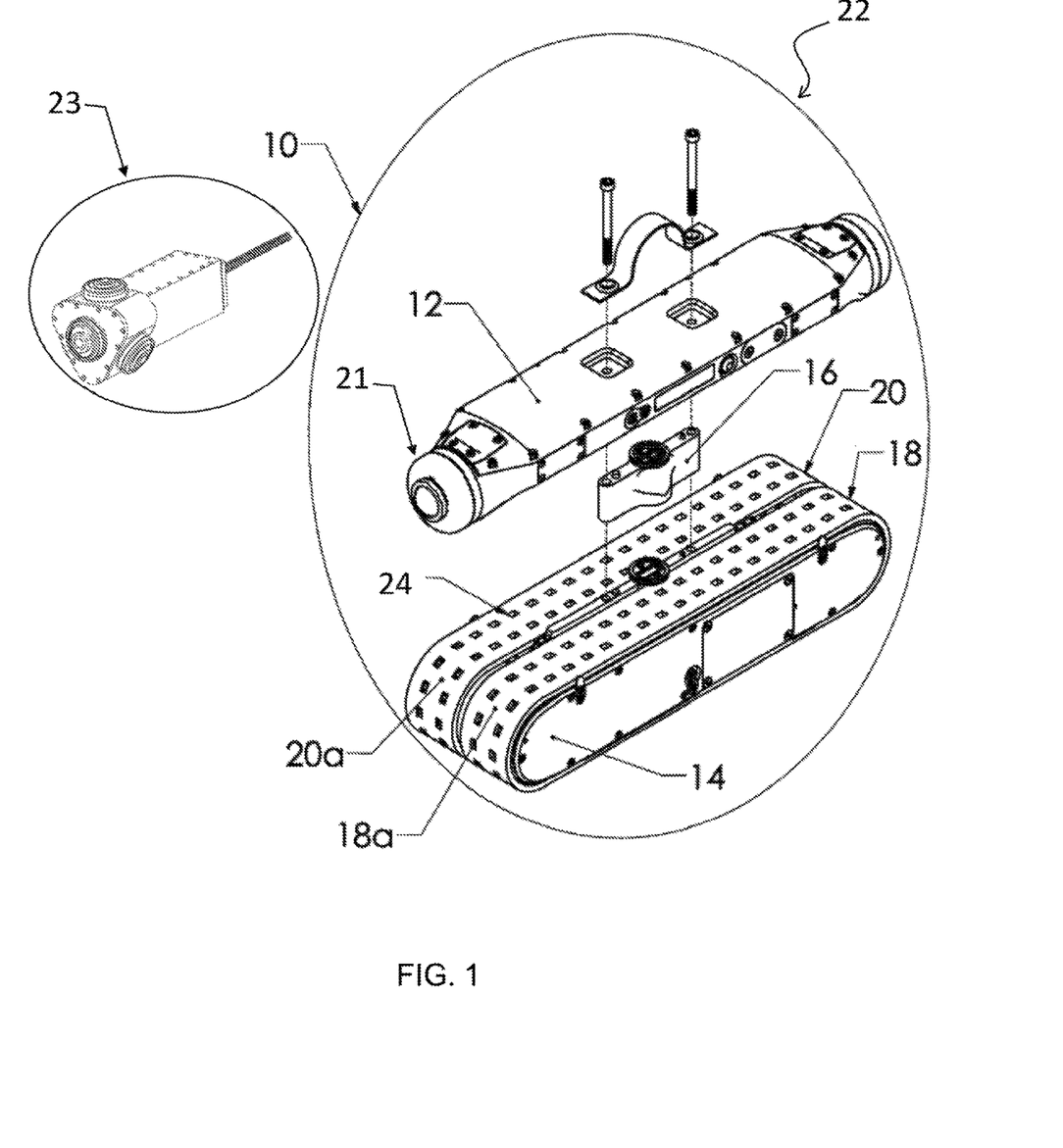
FIG. 1 illustrates an example pipe inspection robot.

Referring now to FIG. 1, an example inspection system 22 including a modular pipe inspection robot 10 is illustrated. Such an inspection system 22 may be utilized for capturing pipe inspection data, including imaging data obtained using an imaging device (also referred to as an imager), as further described herein.

For purposes of clarity, a partially exploded view (collectively indicated at 22) of the modular pipe inspection robot 10 is shown in FIG. 1. As explained in more detail, the modular pipe inspection robot 10 may be utilized as an inspection platform to navigate, explore, map, etc., various environments (e.g., water pipes, sewer pipes, tunnels, large chambers, etc.). In an embodiment, the pipe inspection robot 10 may be implemented as an autonomous mobile robot utilized for pipe inspection (e.g., inspecting a large diameter waste water pipe). However, it will be appreciated that the inspection system 22 may be embodied in any number of different types of inspection platforms, including non-autonomous devices and platforms, and may be utilized in a plurality of other environments. For example, in an embodiment the pipe inspection robot 10 may take the form of a floating platform, a larger tracked platform, etc. For example, the inspection platform may be provided in for example as a larger platform for accommodating a larger camera array.

As shown in non-limiting example of FIG. 1, the chassis portion 14 includes a first track 18 and a second track 20, having surfaces 18a, 20a, each of which define a plurality of openings 24 there-through. Collectively, the first and second tracks 18, 20 define a spacing there-between, and cover substantially the entire width of the chassis portion 14. In the example of FIG. 1, the width of the chassis portion is approximately 100 millimeters, and the first and second tracks 18, 20 collectively cover approximately 92 of the 100 millimeters.

The pipe inspection robot 10 used by way of example for descriptive purposes includes a sensor component 12 and a chassis portion 14. The sensor component 12 is electrically and mechanically connected to the chassis portion 14. As shown in FIG. 1, the pipe inspection robot 10 may also include a riser portion 16 which is positioned between the sensor component 12 and the chassis portion 14 and is electrically and mechanically connected to each. The riser portion 16 operates to increase the distance that the sensor component 12 is situated above the lowest portion of the pipe and may be utilized in larger pipe applications or environments, such as a large tunnel or chamber, to provide a desired vantage point for various sensing devices of the sensor component 12, including a camera 21. Additionally, riser portion 16 and sensor component 12 are modular, i.e., they may be coupled/decoupled to and from the pipe inspection robot 10. Functionality of the pipe inspection robot 10 may be implemented by a computing device and/or a computer program stored on a computer-readable medium, as further described herein.

According to an embodiment, the sensor component 12 includes one or more sensing devices, e.g., a camera 21 having a wide-angle lens for capturing images of conditions within the environment. Further, sensor component 12 may include a computing device or other circuitry coupled to the sensing device(s) and having a processor. Therefore, pipe inspection robot 10 may capture, store and process raw information captured by the sensing device(s), and control various other components of the pipe inspection robot 10, e.g., track movement. Sensor component 12 may include a memory device to store software that is utilized by the pipe inspection robot 10 to navigate, explore, map, etc., the environment.

As illustrated in FIG. 1, an imaging device 23 may be included in place of sensor component 12 or a subcomponent thereof, e.g., camera 21. Accordingly, an imaging device 23 including a camera array may be added to the inspection system 22.

Figure 2:
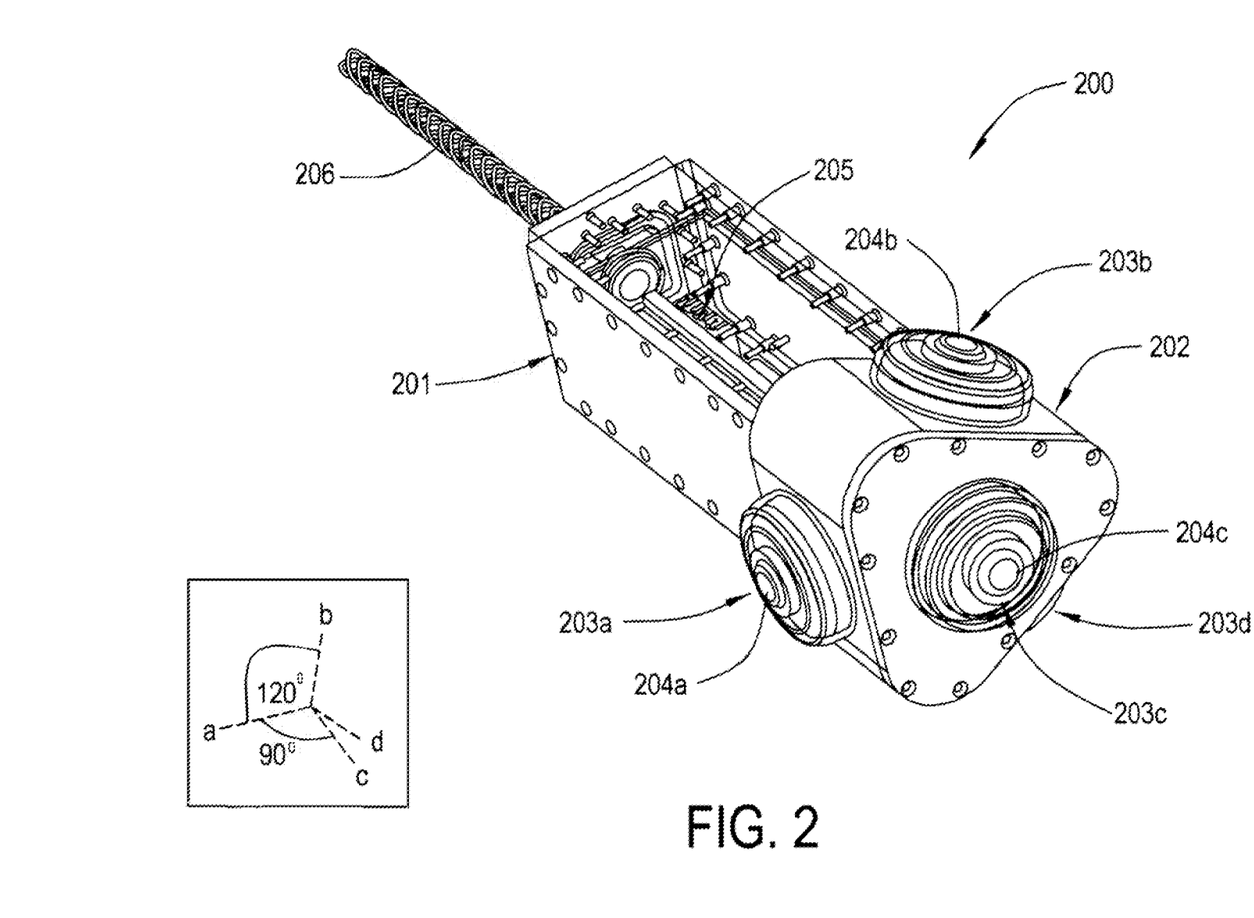
FIG. 2 illustrates an example imaging device.

Referring to FIG. 2, an imaging device 200 (e.g., equivalent to the imaging device 23 illustrated in FIG. 1) may be provided for use in connection with the pipe inspection robot 10 or other inspection platform. For example, the imaging device 200 may be an integral part of (integrated into) the sensor component 12 or used in place of the sensor component 12. The imaging device 200 includes a main housing 201 and a camera housing 202. The main housing 201 and camera housing 202 may be formed as a single piece or as separate pieces or parts.

The main housing 201 includes circuitry, e.g., a printed circuit board or system-on-chip assembly 205 that operates the cameras 203a-d of the imager 200, as further described herein. The camera housing 202 includes cameras 203a-d therein, which are arranged to provide, collectively, a full view (e.g., 360 degree) of the environment. The cameras 203a-d may include wide-angle cameras, e.g., with fish eye lenses or other wide-angle optics 204a-d. In an embodiment, cameras 203a-d each capture high resolution images, e.g., 12-megapixel to 15-megapixel images, which are suitable for imaging pipe or tunnel interior wall features at a significant distance, e.g., on the order of ten to twenty feet or more.

In the example imaging device 200 illustrated in FIG. 2, the imaging device 200 includes four cameras 203a-d that are arranged about four sides of the camera housing 202, as shown. This provides images, captured by the cameras 203a-d, that include overlapping views of the environment such that the images can be processed to produce a full 360-degree view of the environment. The composite image formed by this process provides an image of an interior region that is larger than a field of view of any of the cameras individually. For example, the cameras 203a-d are implemented such that the cameras 203a, 203b, and 203d are housed within apertures of a triangular housing and each has a viewing axis that is offset from the adjacent cameras by about 120 degrees. As further illustrated in FIG. 2, a fourth camera 203c of the array is housed in an aperture within an end, triangular part, with its viewing axis being offset from the other cameras by about 90 degrees. This is illustrated in the axis view of FIG. 2 (dashed lines), with the axes being assigned a letter according to the respective camera's viewing axis as situated in the imaging device 200. Therefore, collectively the cameras 203a-d provide at least a hemispherical field of view, and nearly a spherical field of view.

In one example, the images captured by cameras 203a-d undergo image processing to form a coherent combination or composite image. In one example the image processing includes, for instance, using optical images taken by the cameras 203a-d of the imaging device 200 and stitching or combining them by software algorithms, and thereafter using geometric parameters (provided by a shape, such as an interior of a cylinder) to combine the images together in a virtual 3D view. For example, a processor may process raw image data to align the individual images, remove any overlapping regions, project or map a combined image to the interior of a cylinder, and provide the resulting composite image to a display device.

A software algorithm for presentation/visualization may be used to appropriately format and present the composite image to a user, e.g., depending on the type of display device. In one example, the image processing includes preprocessing individual images, e.g., de-warping, cropping, etc., of the images, prior to or as part of the combining of the images. The output images may be formed into a 2D rectangular view, in addition to or in lieu of mapping the images to form a continuous 360-degree view of the interior of a cylinder or similar shape such as a sphere or hemisphere. As will be appreciated, the nature of the display device (for example, a 2D display device, a heads up or goggle display device, etc.) may dictate the type or amount of image processing applied to the images.

A power or data connector 206 provides power, data or a combination thereof to the components of the main housing 201 and camera housing 202. The power or data connector 206 may act to communicate control signals to the imaging device 200 and components thereof, receive data (e.g., images) from the imaging device 200, and may also provide a power source to the imaging device 200. The imaging device 200 may process the images as described herein or may communicate the images to a remote device, e.g., via power or data connector 206, for processing by the remote device. A combination of the foregoing is also possible.

Figure 3:
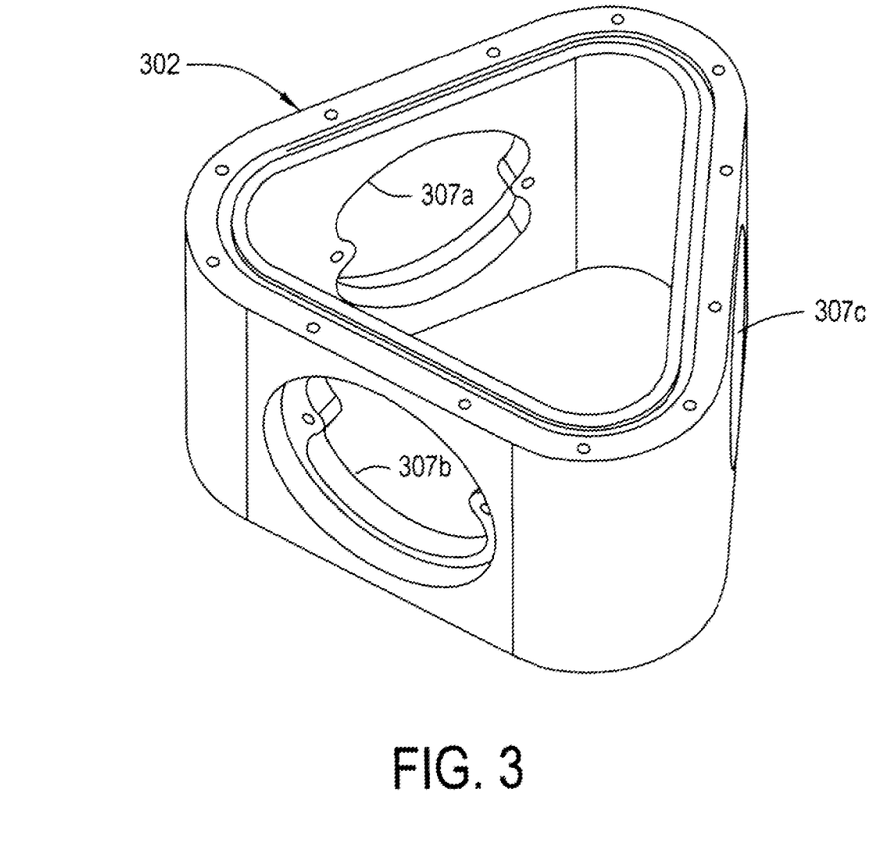
FIG. 3 illustrates an example camera housing for the imaging device of FIG. 2.

FIG. 3 shows a perspective view of an example camera housing 302, e.g., as for example used in the imaging device 200 of FIG. 2. The camera housing 302 includes apertures 307a-c for accommodating cameras, e.g., cameras 203a, b and d, e.g., at least including the lenses 204a, b and d thereof. One end of the camera housing 302 is attachable to the main housing 201.

Figure 4:
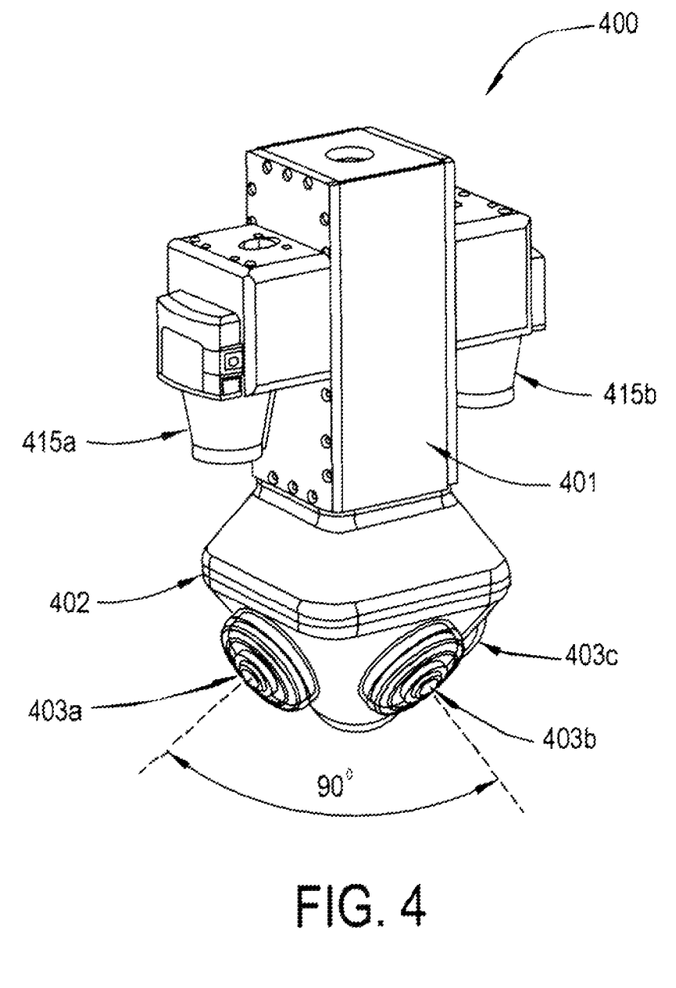
FIG. 4 illustrates an example imaging device.

Illustrated in FIG. 4 is another example of an imaging device 400. In this example, the imaging device 400 comprises four cameras, three of which (403a-c) are visible in the view of FIG. 4. The imaging device 400 includes a main housing 401 that similarly may include electronics to control the cameras 403a-c of the imaging device 400. The camera housing 402 of imaging device 400 positions four cameras, three of which are visible (403a-c), at an end of the imaging device 400. The imaging device 400 may include light detection and ranging (LIDAR) units 415a-b, e.g., positioned off to the side of the main housing 401. This provides the imaging device 400 with the capability to capture LIDAR data when in operation. Using the cameras 403a-c arranged as shown, the imaging device 400 provides overlapping images that may be processed to form a virtual panoramic or complete view of the environment or a region thereof, e.g., the interior of a large diameter pipe. For example, if the lenses of cameras 403a-c are wide angle lenses, and when images obtained from such lenses are combined, the cameras 403a-c provide at least a hemisphere of imaging coverage (e.g., a hemisphere oriented beneath the imaging device 400 as oriented in FIG. 4). Thus, when the imaging device 400 is mounted to an inspection platform, e.g., pipe inspection robot 10 of FIG. 1, in a front-facing position, images of the front, lateral sides, top and bottom of an enclosure such as a large diameter pipe, tunnel or chamber may be imaged simultaneously.

As illustrated in FIG. 4, the lower part of the imaging device 400 includes a pyramidal (square base) structure having four apertures therein for accommodating the four cameras 403a-c (three of which are illustrated in FIG. 4). In the example of FIG. 4, the pyramid shaped structure arranges the cameras 403a-c such that each has a viewing axis that is offset from an adjacent camera by about 90 degrees (illustrated for cameras 403a and 403b in FIG. 4).

Figure 5:
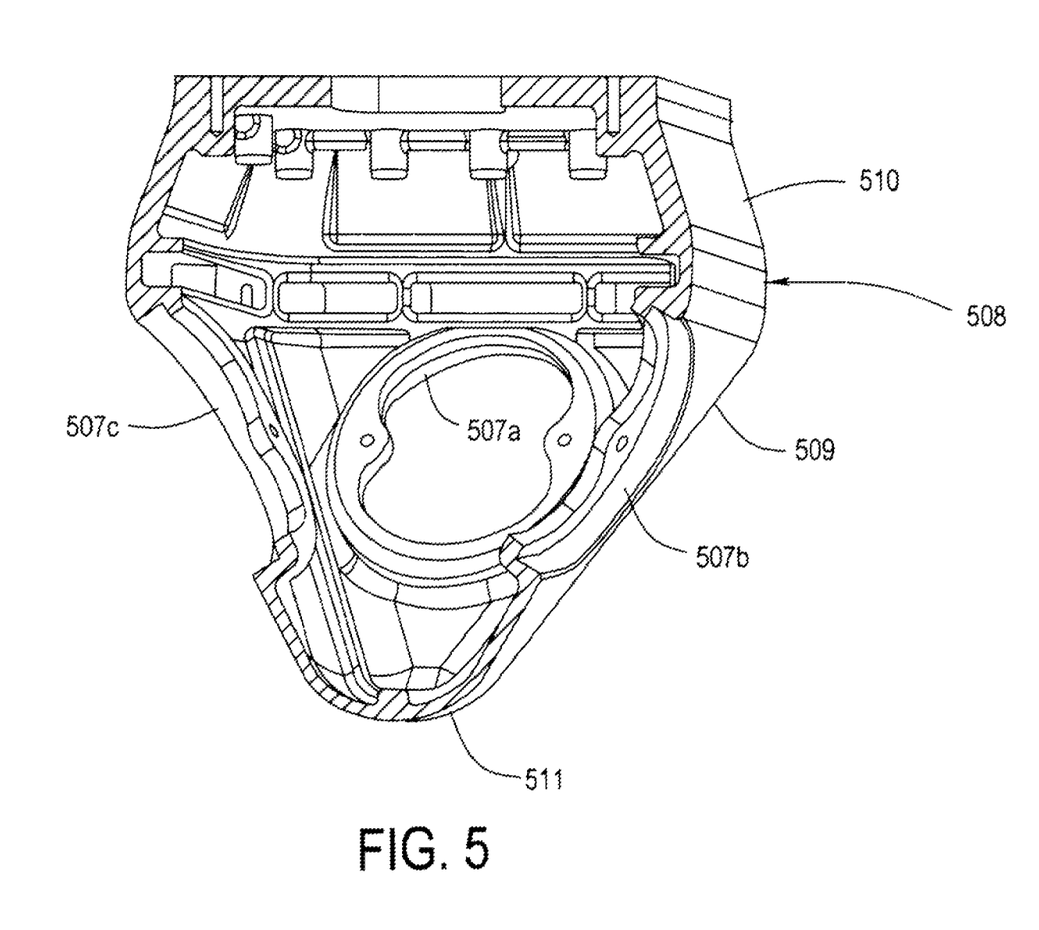
FIG. 5 illustrates a part of a camera housing for the imaging device of FIG. 4.

FIG. 5 shows part 508 of the camera housing 401 of FIG. 4. In the example illustrated, the part 508 includes an angled geometry that positions the cameras thereof to appropriate fields of view for imaging. For example, the part 508 includes a tapered edge 509, an angled edge 510 and a housing tip 511. The apertures 507*a-c* are formed in the part 508 to accommodate placement of the cameras. The part 508 includes connection arrangements for attachment to the main housing (e.g., housing 401 of FIG. 4), for example via snapping or clipping in place, or being attached via screws.

Figure 6:
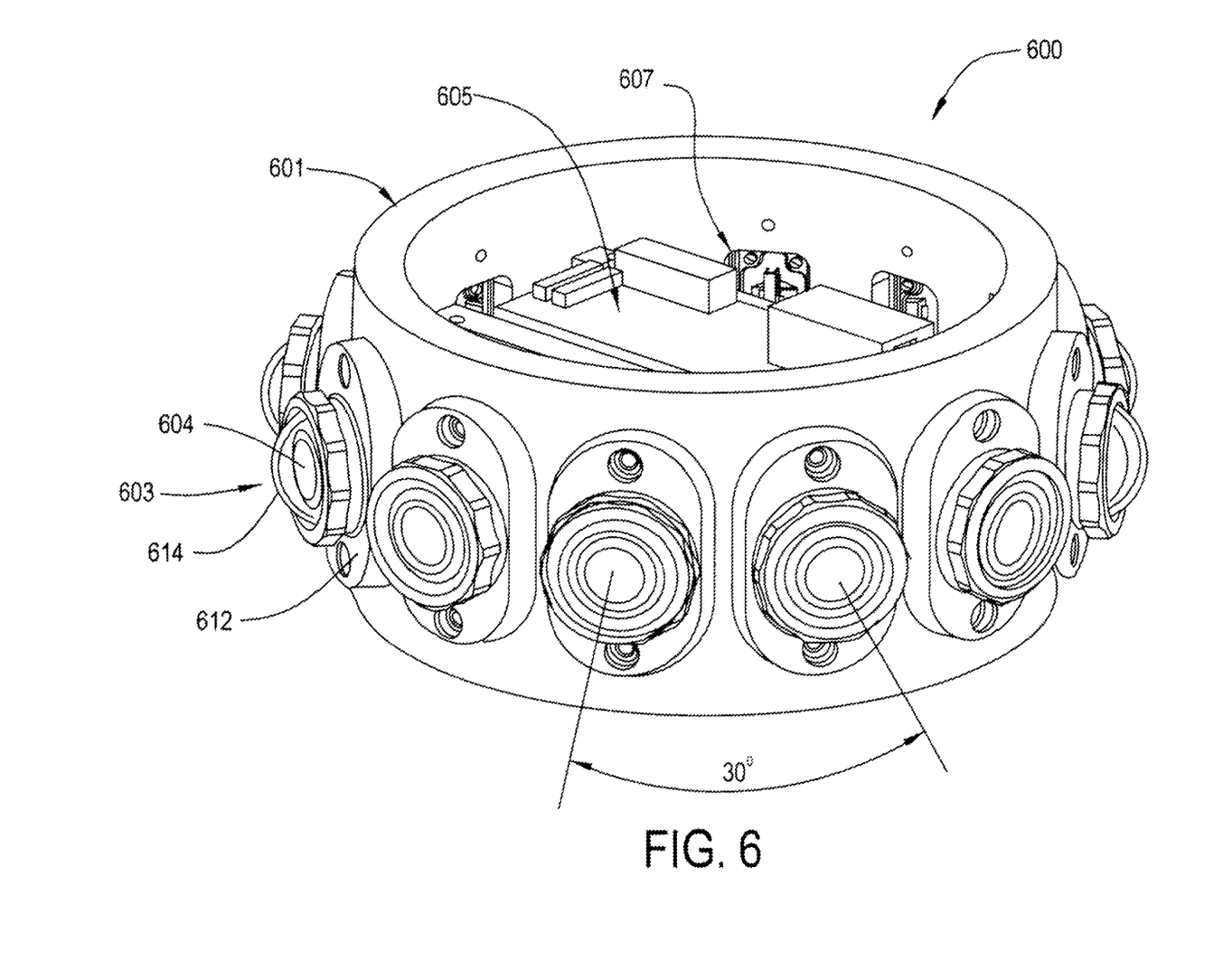
FIG. 6 illustrates an example imaging device.

FIG. 6 illustrates another example imaging device 600. In this example, the imaging device 600 includes a plurality of cameras (e.g., 12 cameras, 8 of which are visible in FIG. 6) arranged about a cylindrical or circular camera housing 601. This arrangement provides a convenient way to image the inside of a large diameter cylinder, e.g., a large diameter pipe or tunnel.

The cameras, e.g., camera 603, are attached to the camera housing 601 at apertures (one of which is indicated at 607) with an attachment housing 612, e.g., which may be screwed onto the camera housing 601. The cameras, e.g., camera 603, comprise wide-angle lenses, e.g., lens 604, and can include other optics 614, e.g., a protective cover or secondary optics for the wide-angle lens 604. Imaging device 600 includes electronics 605 such as a printed circuit board that operate the cameras.

In an embodiment, imaging device 600 includes 12 cameras, each having its viewing axis offset from an adjacent camera by about 30 degrees, as illustrated in FIG. 6. This provides a large amount of overlap between images, allowing for increase quality composite images of the interior of a large diameter pipe, tunnel or chamber.

An embodiment therefore provides a way of deploying a camera array, e.g., a 60-megapixel imaging device on an inspection robot, other inspection platform or system, or as a standalone product. In one example, the camera array comprises twelve cameras, capturing 5-megapixel images each, which are stitched together with software that synchronizes the images and controls their combination into a complete view. The imaging device is suitable for capturing high resolution, full pictures of the inside surface of a large chamber or tunnel, e.g., 20 or more feet in diameter. In an embodiment, an imaging system uses between four and twelve cameras mounted in such a way to capture a 360-degree image with ample overlap between the images so that the results can be stitched together into a single panoramic view, e.g., projected onto the inside wall(s) of a cylinder (virtually) to replicate a pipe's interior.

Figure 7:
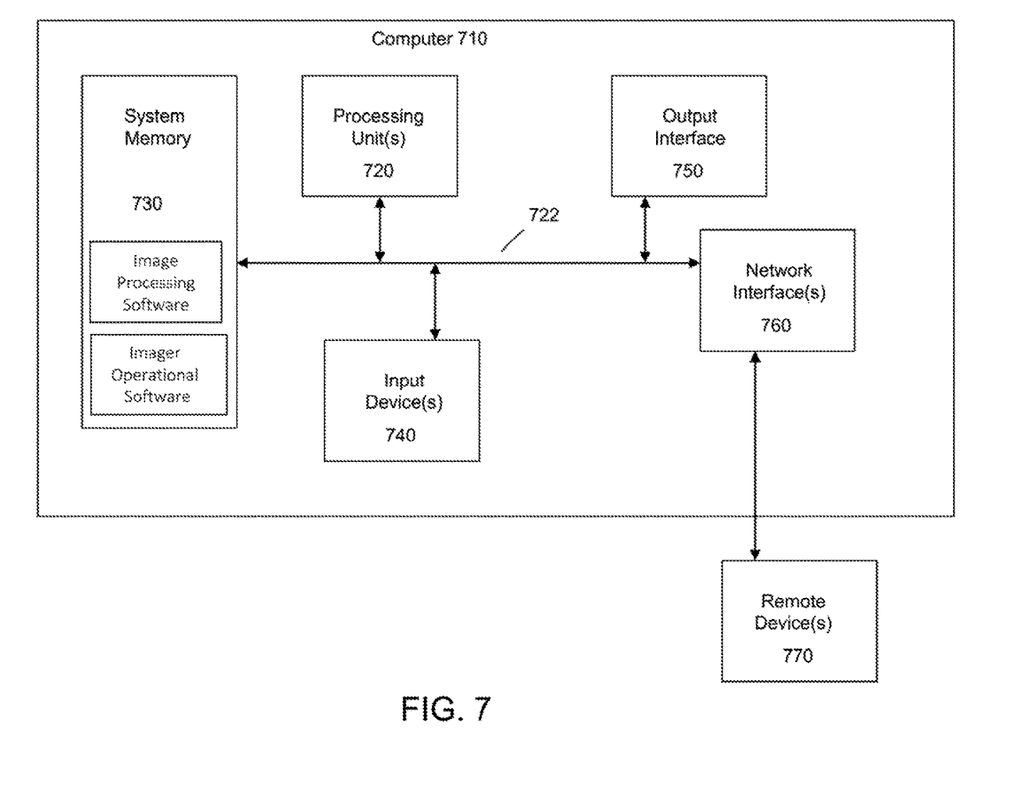
FIG. 7 illustrates an example computing device.

It will be readily understood that certain embodiments can be implemented using any of a wide variety of devices or combinations of devices. Referring to FIG. 7, an example device that may be used in implementing one or more embodiments includes a computing device (computer) 710, for example included in a pipe inspection robot 10 and/or a computer system (e.g., a laptop or desktop computer).

The computer 710 may execute program instructions or code configured to store and process sensor data (e.g., images from an imaging device as described herein) and perform other functionality of the embodiments. Components of computer 710 may include, but are not limited to, a processing unit 720, a system memory 730, and a system bus 722 that couples various system components including the system memory 730 to the processing unit 720. The computer 710 may include or have access to a variety of non-transitory computer readable media. The system memory 730 may include non-transitory computer readable storage media in the form of volatile and/or nonvolatile memory devices such as read only memory (ROM) and/or random-access memory (RAM). By way of example, and not limitation, system memory 730 may also include an operating system, application programs, other program modules, and program data. For example, system memory 730 may include application programs such as image processing software and/or imager operational software. Data may be transmitted by wired or wireless communication, e.g., to or from an inspection robot to another computing device, e.g., a remote device or system.

A user can interface with (for example, enter commands and information) the computer 710 through input devices such as a touch screen, keypad, etc. A monitor or other type of display screen or device can also be connected to the system bus 722 via an interface, such as an interface 750. The computer 710 may operate in a networked or distributed environment using logical connections to one or more other remote computers or databases. The logical connections may include a network, such local area network (LAN) or a wide area network (WAN), but may also include other networks/buses.

It should be noted that various functions described herein may be implemented using processor executable instructions stored on a non-transitory storage medium or device. A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), or any suitable combination of the foregoing. In the context of this document "non-transitory" includes all media except non-statutory signal media.

Program code embodied on a non-transitory storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, or through a hard wire connection, such as over a USB connection.

Example embodiments are described herein with reference to the figures, which illustrate various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific elements are used in the figures, and a particular illustration of elements has been set forth, these are non-limiting examples. In certain contexts, two or more elements may be combined, an element may be split into two or more elements, or certain elements may be re-ordered, re-organized, combined or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:
    an inspection platform configured to move through underground infrastructure;
    the inspection platform comprising:
        a platform selected from one of a tracked platform and a float;
        a modular sensor component comprising a housing enclosing circuitry, the modular sensor component configured to be coupled to, and decoupled from, the platform; and
    a plurality of modular imaging devices forming an array of high resolution cameras, each of the plurality of modular imaging devices being configured to be coupled to, and decoupled from, the modular sensor component;
    wherein:
    a first high resolution camera of the array is coupled to a first side of the modular sensor component, wherein the first high resolution camera has a viewing axis that faces forward with respect to the inspection platform; and
    a second high resolution camera of the array is coupled to a second side of the modular sensor component, the second high resolution camera of the array having a second viewing axis offset at least 90 degrees from the first viewing axis;
    the circuitry configured to operate the array to capture a plurality of images using respective ones of the first and second high resolution cameras;
    wherein the circuitry captures the plurality of images for a composite image of an interior region of the underground infrastructure, the interior region being larger than a single viewing field of any of the high resolution cameras; and
    wherein the circuitry is configured to:
        identify a three-dimensional (3D) shape of the underground infrastructure;
        map data of respective ones of the plurality of images to the 3D shape; and
        provide the composite image as a two-dimensional (2D) output configured for virtual panning.

2. The system of claim 1, wherein each of the high resolution cameras comprises a wide-angle lens.

3. The system of claim 1, further comprising a power and data connector disposed in the modular sensor component, wherein the circuitry operates to transmit image data via the power and data connector to a remote device for image processing.

4. A method, comprising:
    operating an inspection robot to traverse through underground infrastructure;
    the inspection robot comprising:
        a platform selected from one of a tracked platform and a float;
        a modular sensor component comprising a housing enclosing circuitry, the modular sensor component configured to be coupled to, and decoupled from, the platform; and
    a plurality of modular imaging devices forming an array of high resolution cameras, each of the plurality of modular imaging devices being configured to be coupled to, and decoupled from, the modular sensor component;
    wherein:
    a first high resolution camera of the array is coupled to a first side of the modular sensor component, wherein the first high resolution camera has a viewing axis that faces forward with respect to the inspection platform; and
    a second high resolution camera of the array is coupled to a second side of the modular sensor component, the second high resolution camera of the array having a second viewing axis offset at least 90 degrees from the first viewing axis;
    capturing, with the array of the inspection robot, a plurality of images comprising image data for forming a single panoramic image of the interior of the underground infrastructure; and
    processing, using a processor, the image data to form a composite image of the interior of the underground infrastructure;
    the processing comprising:
        identifying a three-dimensional (3D) shape of the underground infrastructure;
        mapping data of respective ones of the plurality of images to the 3D shape; and
        providing the composite image as a virtual panoramic display as a two-dimensional (2D) output configured for virtual panning.

5. A system, comprising:
    an inspection robot having a camera array configured to capture a plurality of images of underground infrastructure
    the inspection robot comprising:
        a platform selected from one of a tracked platform and a float;
        a modular sensor component comprising a housing enclosing circuitry, the modular sensor component configured to be coupled to, and decoupled from, the platform; and
    a plurality of modular imaging devices forming an array of high resolution cameras, each of the plurality of modular imaging devices being configured to be coupled to, and decoupled from, the modular sensor component;
    wherein:
    a first high resolution camera of the array is coupled to a first side of the modular sensor component, wherein the first high resolution camera has a viewing axis that faces forward with respect to the inspection platform; and a second high resolution camera of the array is coupled to a second side of the modular sensor component, the second high resolution camera of the array having a second viewing axis offset at least 90 degrees from the first viewing axis; and
a non-transitory computer readable medium storing instructions executable by a processor, the instructions comprising:
   instructions for forming a composite image by:
      identifying a three-dimensional (3D) shape of the underground infrastructure; and
      mapping data of respective ones of the plurality of images to the 3D shape; and
   instructions for providing the composite image as a virtual panoramic display.

\* \* \* \* \*